(12) United States Patent
Takano et al.

(10) Patent No.: US 6,297,929 B1
(45) Date of Patent: *Oct. 2, 2001

(54) MAGNETIC STORAGE APPARATUS

(75) Inventors: Hisashi Takano, Kodaira; Masahiro Kitada, Hamura; Mikio Suzuki, Kokubunji, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/557,002

(22) Filed: Apr. 20, 2000

Related U.S. Application Data

(63) Continuation of application No. 09/003,506, filed on Jan. 6, 1998, now Pat. No. 6,064,546, which is a continuation of application No. 08/422,928, filed on Apr. 17, 1995, now abandoned.

(30) Foreign Application Priority Data

Apr. 21, 1994 (JP) ................................................. 9-082864

(51) Int. Cl.$^7$ ............................. G11B 5/127; G11B 5/23
(52) U.S. Cl. ......................... 360/97.01; 360/119; 360/125
(58) Field of Search ............................ 360/97.01, 97.02, 360/97.03, 115, 119, 122, 123, 125, 901, 902, 903, 317, 318, 126

(56) References Cited

U.S. PATENT DOCUMENTS 3,975,772 * 8/1976 Lin ........................................ 360/317
4,967,298 * 10/1990 Mowry ................................. 360/317

FOREIGN PATENT DOCUMENTS 4-48707 * 2/1992 (JP) .

* cited by examiner

Primary Examiner—David L. Ometz
(74) Attorney, Agent, or Firm—Antonelli, Terry, Stout & Kraus, LLP

(57) ABSTRACT

The proposed magnetic storage apparatus has the following features. The frequency at which data is recorded is selected to be 45 MHz. The thickness, resistivity and relative permeability of the magnetic film of which the magnetic poles of the magnetic head used in the apparatus are made are designed considering the eddy current loss. Also, the relation of $\mu d^2/\rho \leq 500$ is satisfied where d ($\mu$m) is the thickness of the magnetic film of which the magnetic poles of the magnetic head are made, $\rho$ ($\mu\Omega$-cm) is the resistivity, and $\mu$ is the relative permeability in a low-frequency range. Under these conditions, the amount of attenuation of recording magnetic field is reduced to 10% or below, and problems of writing blur and overwrite value variation which occur as the recording frequency changes can be solved. Moreover, the media data rate is 15 megabytes per sec., and the areal data-recording density is 500 megabits per square inch or more.

12 Claims, 6 Drawing Sheets

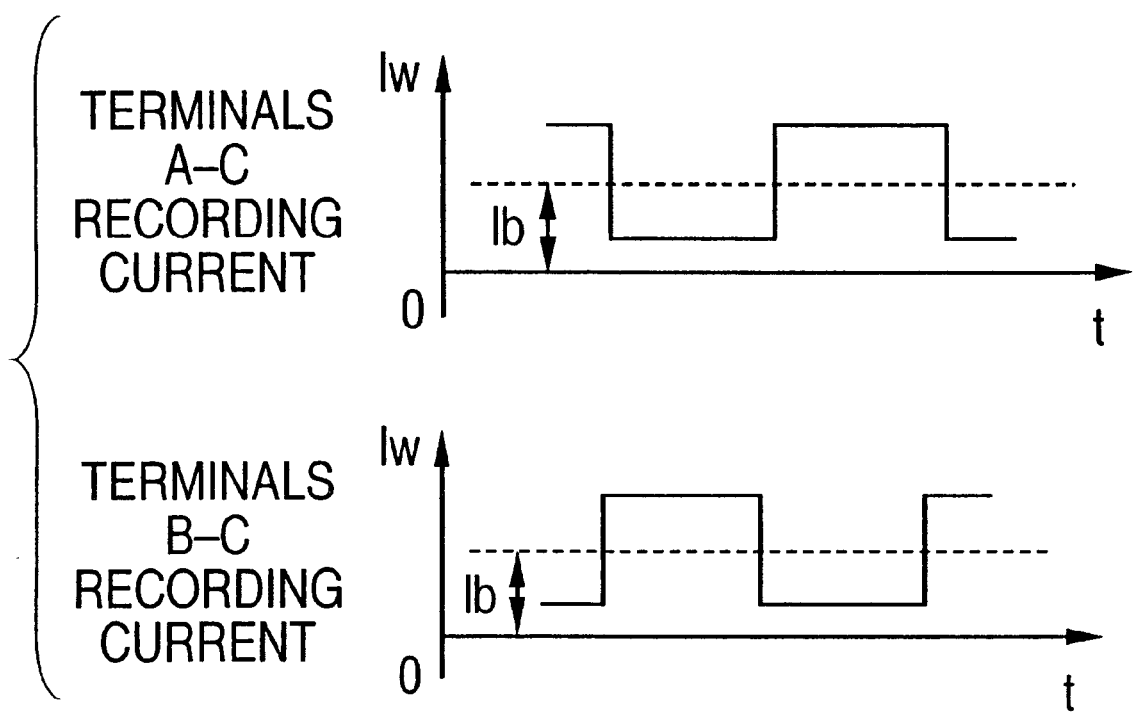

MAGNETIC STORAGE APPARATUS

REFERENCE TO EARLIER FILED APPLICATION(S)

This application is a continuation of the following earlier filed application(s) Ser. No. 09/003,506, filed Jan. 6, 1998, now U.S. Pat. No. 6,064,546, which is a continuation application of U.S. Ser. No. 08/422,928, filed Apr. 17, 1995, abandoned.

BACKGROUND OF THE INVENTION

This invention relates to magnetic storage apparatus capable of both high-density recording and high-speed transfer of data at a time, and particularly to one in which a high areal recording density can be achieved by suppressing the attenuation of the magnetic field intensity at high recording frequencies.

The induction-type thin-film magnetic head mounted on the conventional magnetic disk apparatus has its magnetic poles made of a NiFe alloy thin film of about 3 $\mu$m in thickness. Since the resistivity of this NiFe alloy film is as low as around 16 $\mu\Omega$-cm, the eddy-current loss is increased at high frequencies so that the recording magnetic field intensity is reduced. The amount of writing blur or overwrite value is changed with the recording frequency under the influence of this eddy-current loss. As a conventional example, there is, for example, JP-A-58-115612 in which it is described that the generation of eddy current affects the low-resistivity permalloy (such as NiFe alloy) in such a way as to reduce its high-frequency permeability, thus good reproduction characteristics (sensitivity) are not obtained. Because of these problems, the recording frequency at which the NiFe alloy thin-film head can operate is limited to about 30 MHz. On the other hand, the storage capacity of the magnetic disk apparatus has been steadily increased year after year, up to the extent that the now available 3.5-inch disk storage apparatus has an areal recording density of 350 Mb/in$^2$maximum. The data recording frequency at which this apparatus can record is around 27 MHz which is near the limit of the induction-type thin-film magnetic head using NiFe alloy thin films.

SUMMARY OF THE INVENTION

It is an object of the invention to provide a magnetic storage apparatus using magnetic heads for high-speed access and high-speed transfer without changing the writing blur or overwrite value as the recording frequency changes.

The above object can be achieved by designing the thickness, resistivity and relative permeability considering the eddy current loss in the magnetic pole film of the recording head so as to prevent the writing blur or overwrite value from varying as the recording frequency changes, and by selecting the data recording frequency to be high, and by rotating the magnetic disk fast.

In other words, according to the first invention, there are provided:
(1) a magnetic storage apparatus having means for achieving a media data rate of 15 megabytes per sec. or above and an areal data-recording density of 500 megabits per square inch or above;
(2) a magnetic storage apparatus according to item (1), wherein when information is recorded on a magnetic disk of 3.5-inch diameter or below, this disk is rotated at a rate of 4000 rpm or above in the recording/reproduction mode and the recording frequency is selected to be 45 MHz or above;
(3) a magnetic storage apparatus according to item (1), wherein a metal magnetic film having a coercive force of 2 kOe or above is formed on the magnetic disk used;
(4) a magnetic storage apparatus according to item (1), wherein the rise time of the recording current is selected to be 5 nanosecond (ns) or below;
(5) a magnetic storage apparatus according to item (4), wherein the recording coil 25, 25' (FIGS. 4,8) of an induction type magnetic head used for recording information on the magnetic disk medium is formed by a thin-film process and has three terminals A, B, C, the inductance between the terminals is one microhenry ($\mu$H) or below;
(6) a magnetic storage apparatus according to item (5), wherein the recording coil 25, 25' (FIGS. 4,9) of the induction type magnetic head used for recording information on the magnetic disk medium has a double-layer structure in which the first layer coil 92 and the second layer coil 94 have an equal number of turns but are wound in opposite directions to each other; and
(7) a magnetic storage apparatus according to item (5), wherein the recording coil 25, 25' (FIGS. 4,8) of the induction type magnetic head used for recording information on the magnetic disk medium has a single-layer structure 80 (FIG. 8) in which an intermediate-point terminal is connected at a mid point (c) between both coil ends (a), (b) which mid point corresponds to half the total number of turns of the coil, and a current (FIG. 10) flowing between the terminals (c) and (a) is opposite in phase to a current flowing between the terminals (c) and (b).

According to the second invention, there are provided:
(8) a magnetic storage apparatus having means for causing a relation of $\mu d^2/\rho \leq 500$ to be satisfied where d ($\mu$m) is the thickness of a magnetic film which forms the recording magnetic poles of a magnetic head for recording data or for recording/reproduction of data, $\rho$ ($\mu\Omega$-cm) is the resistivity, and $\mu$ is the relative permeability in a low-frequency region;
(9) a magnetic storage apparatus according to item (8), wherein at least part of the recording magnetic poles of the magnetic head for recording data or for recording/reproduction of data has a multi-layered structure of alternate magnetic layer and insulating layer and the thickness of the multi-layered film is 2.7 $\mu$m or below;
(10) a magnetic storage apparatus according to item (8), wherein at least part of the recording magnetic poles of the magnetic head for recording data or for recording/reproduction of data is made of Co-based amorphous alloy or Fe-based amorphous alloy;
(11) a magnetic storage apparatus according to item (8), wherein at least part of the recording magnetic pole material of the magnetic head for recording data or for recording/reproduction of data has an oxygen concentration distribution in a metal magnetic substance;
(12) a magnetic storage apparatus according to item (11), wherein the recording magnetic pole material of the magnetic head has oxygen-rich particles mixed of which the size is in a range between 0.5 nm and 5 nm inclusive;
(13) a magnetic storage apparatus according to item (11), wherein the oxygen-rich particles mixed in the recording magnetic pole material of the magnetic head contain at least one of the elements Zr, Y, Ti, Hf, Al and Si;
(14) a magnetic storage apparatus according to item (8), wherein the magnetomotive force of the recording head for recording data or for recording/reproduction of data, or the product of the recording current and the number of turns of coil of the head is selected to be 0.5 ampere•turn (AT) or above;
(15) a magnetic storage apparatus according to item (8), wherein at least part of the recording magnetic poles of the magnetic head for recording data or for recording/ reproduction of data has a resistivity of 40 µΩ-cm or above and a relative permeability of 500 or above;

(16) a magnetic storage apparatus according to item (8), wherein at least part of the recording magnetic poles of the magnetic head for recording data or for recording/ reproduction of data has a relative permeability of 500 or below and a resistivity of 40 µΩ-cm or below;

(17) a magnetic storage apparatus according to item (8), wherein the rise time of recording current is 5 nanosecond (ns) or below.

(18) a magnetic storage apparatus according to item (17), wherein the recording coil of an induction type magnetic head for recording information on a magnetic disk medium is formed by a thin film process and has three terminals, and the inductance between the terminals is one microhenry (µH) or below;

(19) a magnetic storage apparatus according to item (18), wherein the recording coil 25" (FIG. 9) of the induction type magnetic head for recording information on the magnetic disk medium has a double-layer structure in which the first layer coil 92 and the second layer coil 94 have an equal number of turns but are wound in opposite directions to each other;

(20) a magnetic storage apparatus according to item (18), wherein the recording coil 25' (FIG. 8) of the induction type magnetic head used to record information on the magnetic disk medium has a single-layer structure 80 in which an intermediate-point terminal is connected at a mid point (c) between both coil ends (a), (b) which mid point corresponds to half the total number of turns of the coil, and a current (FIG. 10) flowing between the terminals (c) and (a) is opposite in phase to a current flowing between the terminals (c) and (b); and

(21) a magnetic storage apparatus according to item (8), wherein a recording/reproduction separation type head is provided which uses a magneto-resistive element, spin-valve element or giant magneto-resistive element for reproduction of information.

If the high-frequency loss (tan δ) in the magnetic film is due to only the eddy current loss, it can be expressed by $$\tan \delta = \mu'' / \mu' \qquad (1)$$
$$= R / \omega L$$
$$= \mu_0 \mu \pi d^2 f / C\rho$$

where $\mu'$ and $\mu''$ are the real part and imaginary part of the complex permeability, C is a constant depending on the film shape, and $\mu_0$ is the permeability of vacuum. By substituting the relative permeability $\mu$, thickness d and resistivity ρ peculiar to the magnetic film into Equation (1), it is possible to estimate the eddy current loss, tan δ at a frequency f. Since it can be considered that the change of head efficiency (efficiency for conduction of magnetic flux) to frequency is proportional to the change of the real part of the complex permeability, the frequency dependency of the head efficiency can be estimated from the cosine of the δ which is calculated from Equation (1). That is, the head efficiency η at each frequency can be expressed by the following equation:

$$\eta = \cos[\arc \tan(\mu_0 \mu \pi d^2 f / C\rho)] \qquad (2)$$

Thus, the head efficiency η at a given frequency f can be extrapolated from the value $\mu d^2/\rho$ in Equation (2) where $\mu$ is the relative permeability, d is the thickness and ρ is the resistivity, peculiar to the magnetic film.

If this head is combined with a magnetic disk of a metal magnetic film which has small writing blur or overwrite value variation at the time of high frequency recording and of which the coercive force is 2 kOe or above, it is possible to provide a high-performance magnetic storage apparatus capable of operating at an areal recording density of 500 Mb/in² or above, recording frequency of 45 MHz or above and media data rate of 15 MB/s or above.

FIG. 7 shows the relation between the cost of input/output unit and the transfer speed per magnetic disk storage apparatus which constitutes the input/output unit, in which case a data bus of two-byte width Fast and Wide SCSI (Small Computer System Interface) is used for the input/output (I/O) interface. From FIG. 7, it will be seen that when the data bus of two-byte width Fast and Wide SCSI interface is used, data transfer can be made at a maximum of 20 MB/s. In this case, if the transfer speed per magnetic disk storage apparatus is 15 MB/s or above, the cost of input/output unit can be reduced.

Moreover, if the capacity per disk unit is 550 MB, it is possible to handle OS (Operation Software) such as Windows or Workplace. In order to realize this capacity by a single 3.5-inch magnetic disk, it is necessary that the areal data-recording density be selected to be 500 Mb/in² or above.

BRIEF DESCRIPTION OF THE DRAWINGS

FIG. 10 illustrates opposite phase currents flowing between terminals of a three terminal recording coil.

DESCRIPTION OF THE PREFERRED EMBODIMENTS (First Embodiment)

Figure 1:
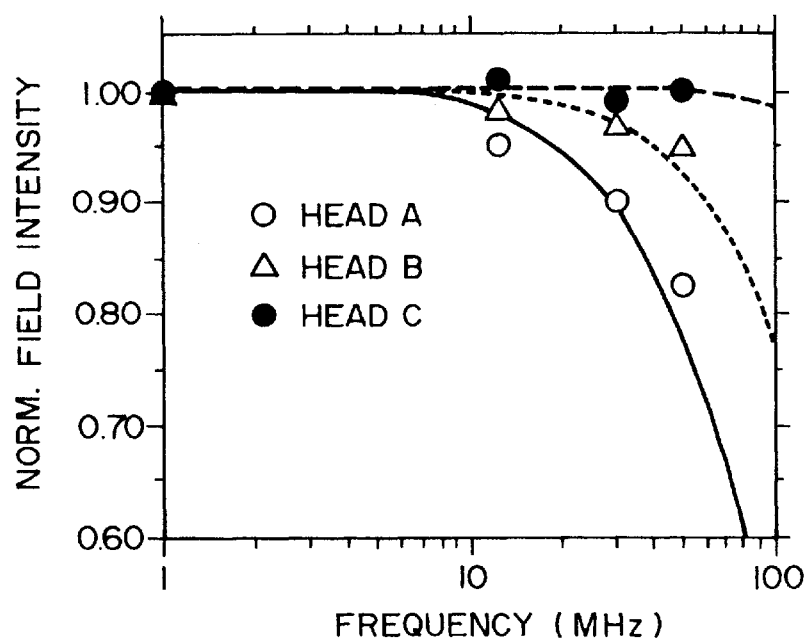
FIG. 1 is a graph showing measured results of the frequency-dependent recording magnetic field which changes with electric characteristics and magnetic characteristics of magnetic pole materials of thin-film magnetic heads, and calculated results of the head efficiency.

Three different induction-type thin-film magnetic heads were prepared which use magnetic poles of different resistivity ρ, film thickness d, and relative permeability $\mu$. The frequency-dependency of the recording magnetic field intensity of each sample was measured by use of the electron beam tomography method. The results are shown in FIG. 1. Table 1 lists the magnetic materials used for each head, magnetic pole thickness d, resistivity ρ, and relative permeability p in a low-frequency range of 1 MHz or below.

The head A has its magnetic poles made of an Ni—Fe single-layer film of 3 μm in thickness. The head B has its poles made of a multi-layer of 2.2-μm thick Co—Ni—Fe films with a 0.1-μm thick intermediate layer $Al_2O_3$ interposed therebetween. Thus, the total thickness of the poles of this head is 4.5 μm. In the multi-layer film of Co—Ni—Fe/$Al_2O_3$/Co—Ni—Fe, when the thickness of the single Co—Ni—Fe film is 2.7 μm or above, the rate of attenuation of the magnetic field intensity reaches 10% or above at a recording frequency of 45 MHz, and hence the writing blur, or overwrite value is changed with recording frequency. Therefore, in this embodiment, the thickness of the single Co—Ni—Fe film is selected to be 2.2 μm. The head C has its magnetic poles made of a 3-μm thick Co—Ta—Zr amorphous single-layer film of which the resistivity is 90 μΩ-cm.

TABLE 1

The characteristic values of materials of heads

| | | Magnetic materials | Pole thickness d(μm) | Resistivity ρ (μΩ-cm) | Relative Permeability μ |
|---|---|---|---|---|---|
| For comp. | Head A | NiFe | 3.0 | 16 | 1000 |
| Embodiments | B | CoNiFe multilayer | 2.2 | 16 | 1000 |
| | C | CoTaZr | 3.0 | 90 | 1000 |

FIG. 1 shows the measured results of the frequency dependency of normalized recording magnetic field intensity, and the calculated results of head efficiency η from Equation (2). From FIG. 1, it will be seen that as to the head A of Ni—Fe single-layer film magnetic pole, the recording field intensity is decreased at 10 MHz or above and reaches 60% or below, at 100 MHz, as low as the intensity in the low-frequency region. On the other hand, as to the head B, the eddy current loss is remarkably decreased since the films Co—Ni—Fe are multilayered with the $Al_2O_3$ insulating layer interposed therebetween, though the permeability and resistivity of the Co—Ni—Fe film are equivalent to those of NiFe film of head A. The attenuation of field intensity at 100 MHz, of this head B is about 20%, or its frequency characteristic is improved. As to the head C, the frequency characteristic is excellent since the attenuation of field intensity at 100 MHz is substantially zero. The constant C in Equation (2) is a parameter depending on the shape of magnetic poles. If C=14, the calculated results can be made well coincident with the experimental results.

Here, the head performance index ξ for indicating the degree of deterioration of the frequency characteristic of head recording field can be defined as follows.

$$\xi = \mu d^2 / \rho \quad (3)$$

Thus, the performance index ξ of each head listed in Table 1 can be calculated from Equation (3) as follows.

Head A; ξ=562.5
Head B; ξ=302.5
Head C; ξ=100

Figure 2:
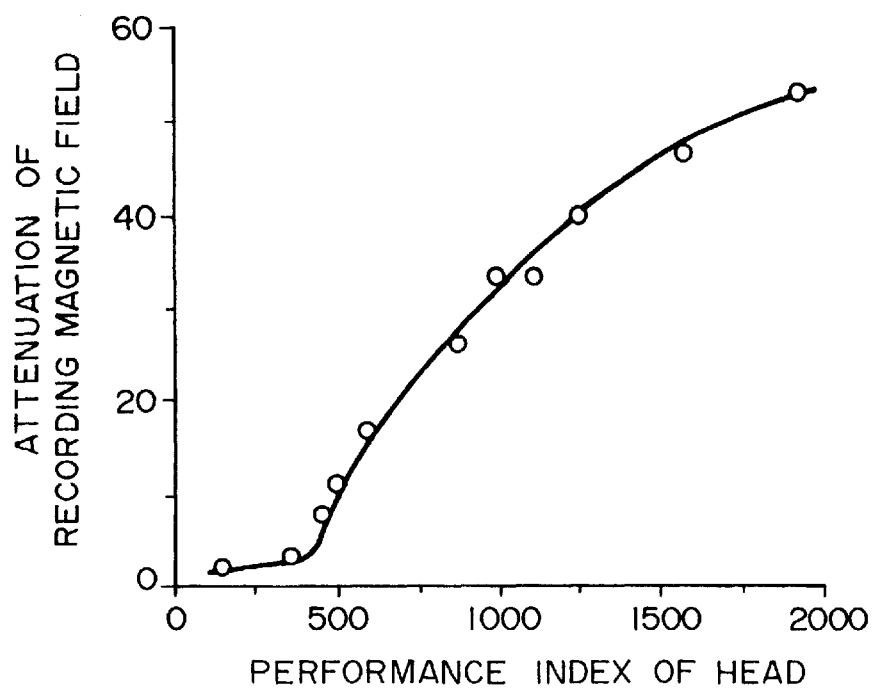
FIG. 2 is a graph showing the relation between the amount of attenuation of recording magnetic field and head performance index ξ at a recording frequency of 45 MHz.

FIG. 2 show the measured results of the relation between the attenuation of field intensity and head performance index ξ at a recording frequency of 45 MHz, of a large number of samples of thin-film magnetic heads with selected various different values of the thickness, resistivity and relative permeability of magnetic poles. From FIG. 2, it will be understood that the attenuation of field intensity at a recording frequency of 45 MHz can be kept at 10% or below under the condition of ξ≦500.

(Second Embodiment)

Figure 3A:
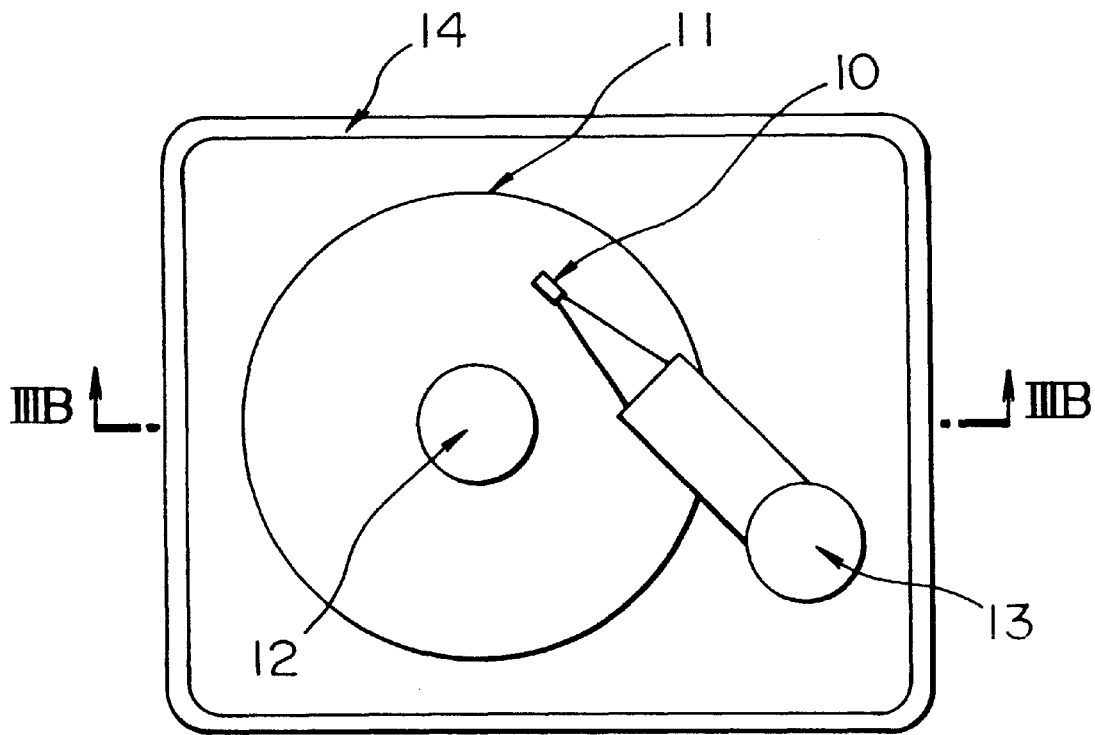
FIGS. 3A and 3B are a plan view of a magnetic disk storage apparatus according to this invention, and a cross-sectional view taken along a line of arrows IIIA—IIIA in FIG. 3A, respectively.
Figure 3B:
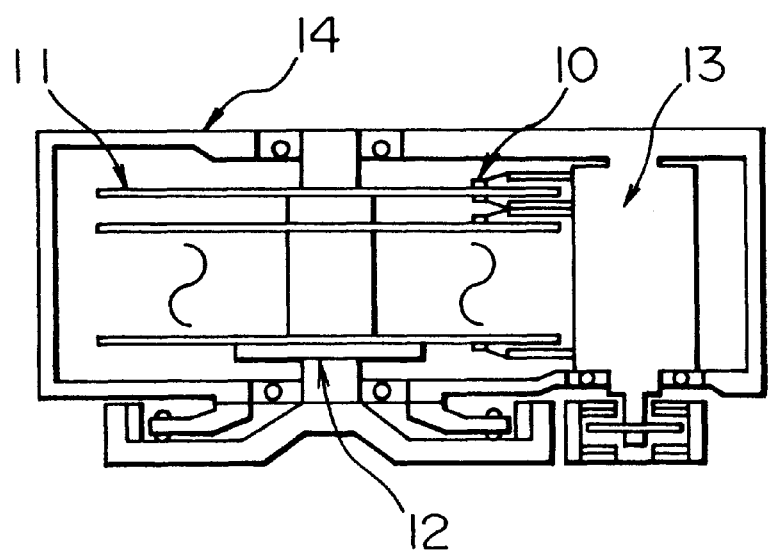

A description will be made of a magnetic storage apparatus using thin-film magnetic heads produced according to this embodiment. A magnetic disk apparatus of this embodiment is schematically shown in FIGS. 3A and 3B. In FIGS. 3A and 3B, there are shown a magnetic head 10, a magnetic disk 11 of about 3.5 inch in outer diameter, a spindle 12 for rotating the disk, a positioning mechanism 13 for the magnetic head, and a housing 14. The magnetic head 10 is a self-recording/ reproduction type head formed of induction-type elements for recording and reproduction, and it has a track width of 5.0 μm. The magnetic poles of the head are made of Co—Ta—Zr amorphous alloy thin film which has a saturation flux density of 1.3 Tesla, a resistivity p of 90 μΩ-cm, a relative permeability μ of 1000, and a thickness d of 3 μm. The gap length of the head is 0.4 μm. The poles of the head may be made of other materials than Co—Ta—Zr amorphous alloy thin film, for example, an amorphous alloy thin film Fe—B—Si—C which has a saturation flux density of 1.6 T or a multi-layer film of Co—Ni—Fe/$Al_2O_3$/Co—Ni—Fe or an Ni—Fe film containing particles $ZrO_2$, $Y_2O_3$, $TiO_2$, $HfO_2$, $Al_2O_3$ or $SiO_2$ of 2 nm to 3 nm in diameter. In either case, the same effect as in this embodiment can be achieved. It is experimentally confirmed that when particles of an oxide are mixed in the magnetic film, it is desirable to select a diameter of 0.5 nm to 5 nm. The reason is that in this range of particle size, only the resistivity of magnetic film can be increased without remarkable reduction of saturation flux density or soft magnetic characteristic. Although the resistivity of an Ni—Fe film containing particles $ZrO_2$, $Y_2O_3$, $TiO_2$, $HfO_2$, $Al_2O_3$ or $SiO_2$ of 2 nm to 3 nm size is increased up to about 40 μΩ-cm, the relative permeability is around 1000, and it exhibits good soft magnetic characteristic. When the poles of the magnetic head are made of an NiFe thin film containing no such oxide, the high-frequency characteristic can be improved by decreasing the relative permeability up to 500 or below. In this case, however, it is necessary that the recording magnetomotive force of the head be selected to be 0.5 AT or above.

The recording layer of the magnetic disk 11 is made of CoCrTa (the amount of Cr to be added is 16 atom. %) which has a coercive force of 2100 Oe in the recording bit direction and a coercive force orientation ratio of 1.2. The remanence-thickness product, Br•δ in this magnetic disk is 300 G•μm. By use of this recording medium it is possible to improve the linear recording density characteristic and greatly reduce the medium noise in the high linear recording density region. If the coercive force of the medium is 2000 Oe[Oersted] or below, the bit error rate is reduced so that the storage apparatus cannot operate.

At the time of recording and reproduction, the spindle is rotated at a rate of 4491 rpm (rounds per minute), and at this time the head at the outermost periphery of the data-stored region is floated 0.05 μm above the magnetic disk. The recording frequency is so selected that the linear recording density on each track is equal over the range from the innermost periphery to outermost periphery of the data storing region. The recording frequency at the outermost periphery is 67.5 MHz.

In the magnetic disk storage apparatus of this embodiment, the linear data-recording density on each track is 144 kBPI (kilo Bits Per Inch), the track density is 5 kTPI (kilo Tracks Per Inch), and the areal recording density is 720 megabits per square inch. In this embodiment, four magnetic disks are used, the formatted capacity of the apparatus is 2.8 gigabytes, and the data transfer speed is 15 megabytes per sec. Although this embodiment makes data recording by use of 8/9-code, data may be recorded by use of 1–7 RLL as in the prior art, in which case the same performance as in this embodiment can be achieved. In this case, however, the recording frequency is 45 MHz.

Table 2 lists the specifications of the magnetic storage apparatus according this embodiment.

TABLE 2

Specifications of 3.5-inch apparatus

| Storage capacity at formatting | 2.8 GB |
| --- | --- |
| Number of disks | 4 |
| Number of data surfaces | 8 |
| Number of heads | 8 |
| Track number/disk surface | 4427 |
| Maximum linear recording density | 144 kBPI |
| Track density | 5 kTPI |
| Rotational speed | 4491 RPM |
| Recording frequency | 67.5 MHz |
| Transfer speed (to/from Media) | 15 MB/sec |

(Third Embodiment)

A description will be made of the results of combining 2.5-inch, 1.8-inch and 1.3-inch magnetic disks with the magnetic heads of the invention in order to construct a magnetic storage apparatus. The magnetic heads and magnetic disks used in this embodiment are the same as in the second embodiment, the linear data-recording density on each track is 144 kBPI, and the track density is 5 kTPI. Also, the rotation rate of the spindle is so selected that the transfer speed for each disk of different diameter is 15 MB/sec. In this embodiment, as is similar to the second embodiment, data may be recorded by use of the conventional 1–7 RLL, in which case the same performance as in this embodiment can be obtained. In this case, the recording frequency is 45 MHz. Tables 3 to 5 list the specifications of each apparatus.

TABLE 3

Specifications of 2.5-inch apparatus

| Storage capacity at formatting | 1.8 GB |
| --- | --- |
| Number of disks | 4 |
| Number of data surfaces | 8 |
| Number of heads | 8 |
| Track number/disk surface | 2951 |
| Maximum linear recording density | 144 kBPI |
| Track density | 5 kTPI |
| Rotational speed | 6736 RPM |
| Recording frequency | 67.5 MHz |
| Transfer speed (to/from Media) | 15 MB/sec |

TABLE 4

Specifications of 1.8-inch apparatus

| Storage capacity at formatting | 1.4 GB |
| --- | --- |
| Number of disks | 4 |
| Number of data surfaces | 8 |
| Number of heads | 8 |
| Track number/disk surf ace | 2213 |
| Maximum linear recording density | 144 kBPI |
| Track density | 5 kTPI |
| Rotational speed | 8982 RPM |

TABLE 4-continued

Specifications of 1.8-inch apparatus

| Recording frequency | 67.5 MHZ |
| --- | --- |
| Transfer speed (to/from Media) | 15 MB/sec |

TABLE 5

Specifications of 1.3-inch apparatus

| Storage capacity | 0.9 GB |
| --- | --- |
| Number of disks | 4 |
| Number of data surfaces | 8 |
| Number of heads | 8 |
| Track number/disk surface | 1475 |
| Maximum linear recording density | 144 kBPI |
| Track density | 5 kTPI |
| Rotational speed | 13473 RPM |
| Recording frequency | 67.5 MHz |
| Transfer speed (to/from Media) | 15 MB/sec |

(Fourth Embodiment)

Figure 4:
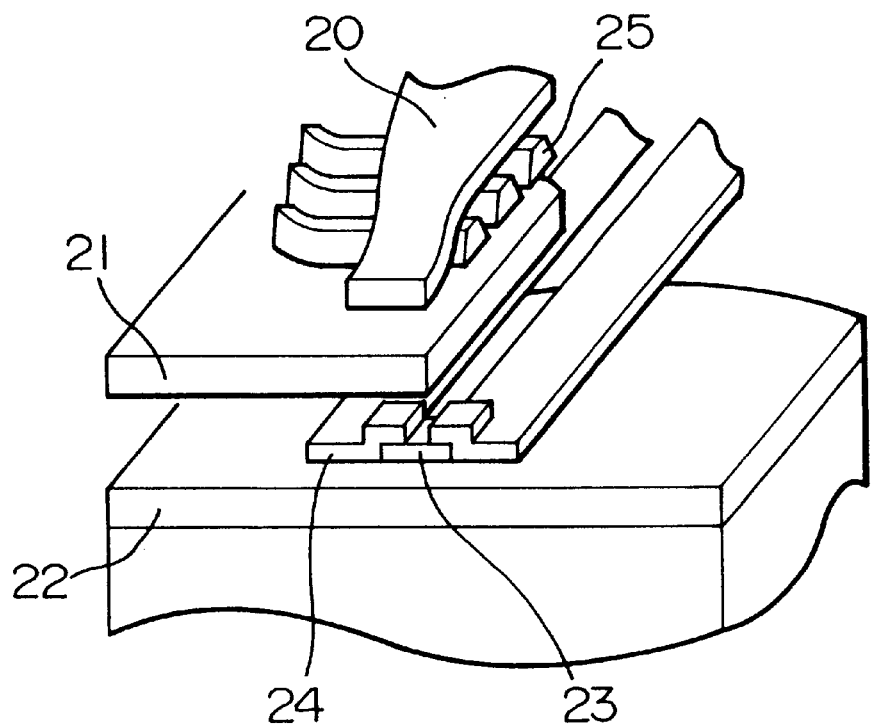
FIG. 4 is a schematic view of the recording/reproduction separation-type head mounted on the magnetic disk storage apparatus according to this invention.

Although the magnetic storage apparatus of the first to third embodiments include induction-type self-recording/reproduction heads, recording/reproduction separation-type heads having magneto-resistive elements (MR elements) for reproduction may be used to construct the magnetic storage apparatus with the same performance. FIG. 4 shows the structure of the recording/reproduction separation-type head used in this embodiment. In FIG. 4, there are shown a recording magnetic pole 20 and an upper shield layer 21 which also serves as the other recording magnetic pole. These magnetic poles are made of an Co—Ni—Fe/$Al_2O_3$/Co—Ni—Fe multi-layered film of which the single Co—Ni—Fe layer has a thickness of 2.2 $\mu$m. The thickness of the $Al_2O_3$ intermediate layer is 0.1 $\mu$m, and the track width of the recording magnetic pole 20 is 3 $\mu$m. A lower shield layer 221 is 1-$\mu$m thick and made of Ni—Fe alloy. A magneto-resistive element 23 is 15 nm thick and made of Ni—Fe alloy. This element 23 is driven by soft film biasing. The magneto-resistive element 23 may be made of other materials than Ni—Fe alloy. For example, it may be a spin-valve type element formed of Ni—Fe layer, Cu layer, Co layer and an Ni—O based, Fe—Mn based or Cr—Mn based antiferromagnetic film or an alloy-based giant magneto-resistive element of Co—Ag, Co—Au, NiFe—Ag, Co—Cu, Fe—Ag or the like or a Co/Cr-, Fe/Cr- or Co/Cu-based multi-layered giant magneto-resistive element.

In FIG. 4, the region between a pair of electrodes 24 corresponds to the reproduction track width and is selected to have a width of 2 $\mu$m. In the recording mode, current of 15 mA op is caused to flow in a 20-turn coil 25, thereby recording arbitrary information on a recording medium, or magnetic layer. In the reproduction mode, a DC current of 8 mA is caused to flow in the lead wire 24, and detection is made of a leaking field from the magnetic medium layer.

This magnetic head is combined with a 3.5-inch magnetic disk in order to construct a magnetic storage apparatus. This disk has a recording layer of CoCrTa (the amount of Cr added is 16 atom. %). The coercive force of this layer in the recording bit direction is 2100 Oersted, and the coercive force orientation ratio is 1.2. The remanence-thickness product Br•δ of the recording layer of the magnetic disk used here is 100 G•$\mu$m. Table 6 lists the specifications of the magnetic storage apparatus according to this embodiment.

TABLE 6

Specifications of 3.5-inch apparatus using
recording/reproduction separation type head

| | |
|---|---|
| Storage capacity (at formatting) | 5.5 GB |
| Number of disks | 4 |
| Number of data surfaces | 8 |
| Number of heads | 8 |
| Track number/disk surface | 7378 |
| Maximum recording density | 170 kBPI |
| Track density | 8.3 kTPI |
| Rotational speed | 4491 RPM |
| Recording frequency | 80.0 MHz |
| Transfer speed (to/from Media) | 18 MB/sec |

(Fifth Embodiment)

Figure 5:
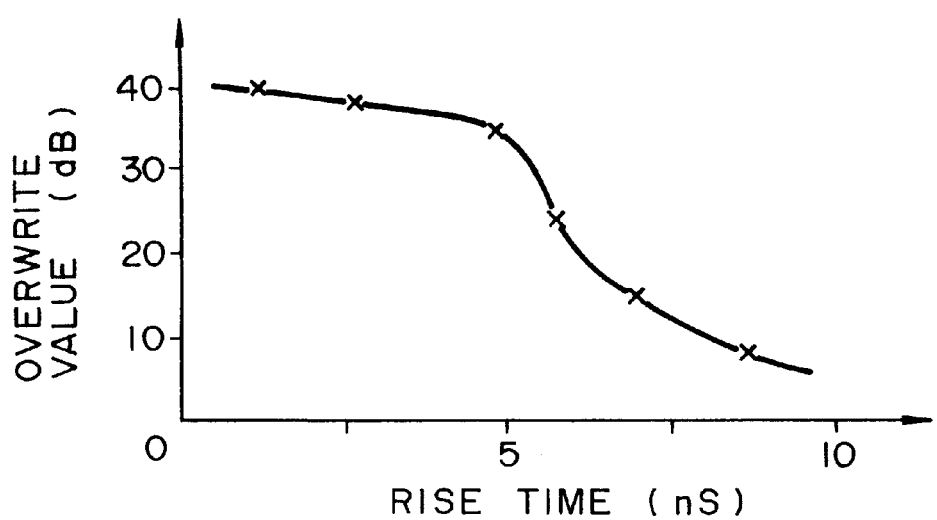
FIG. 5 is a graph showing the relation between the rise time of recording current and overwrite characteristic value.
Figure 6:
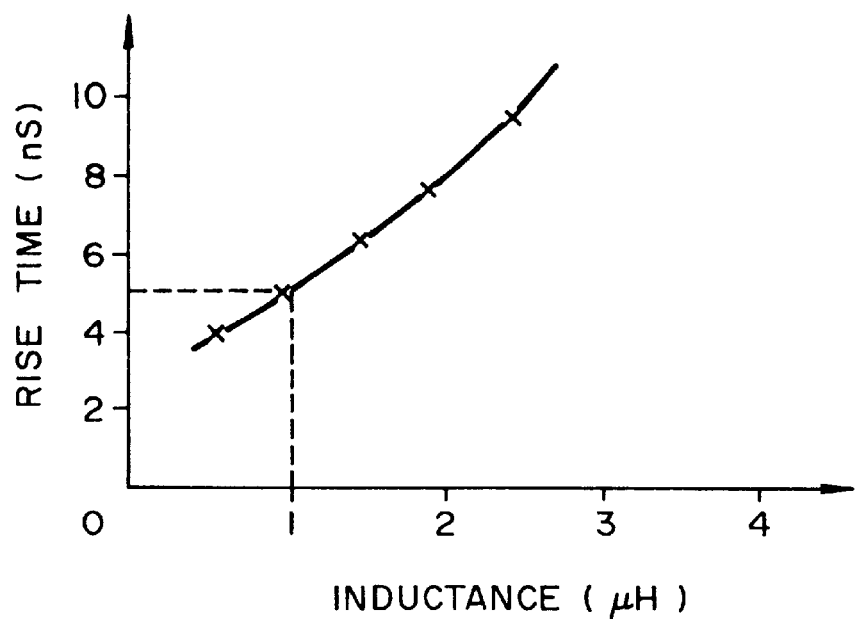
FIG. 6 is a graph showing the relation between the inductance of coil and the rise time of recording current.
Figure 7:
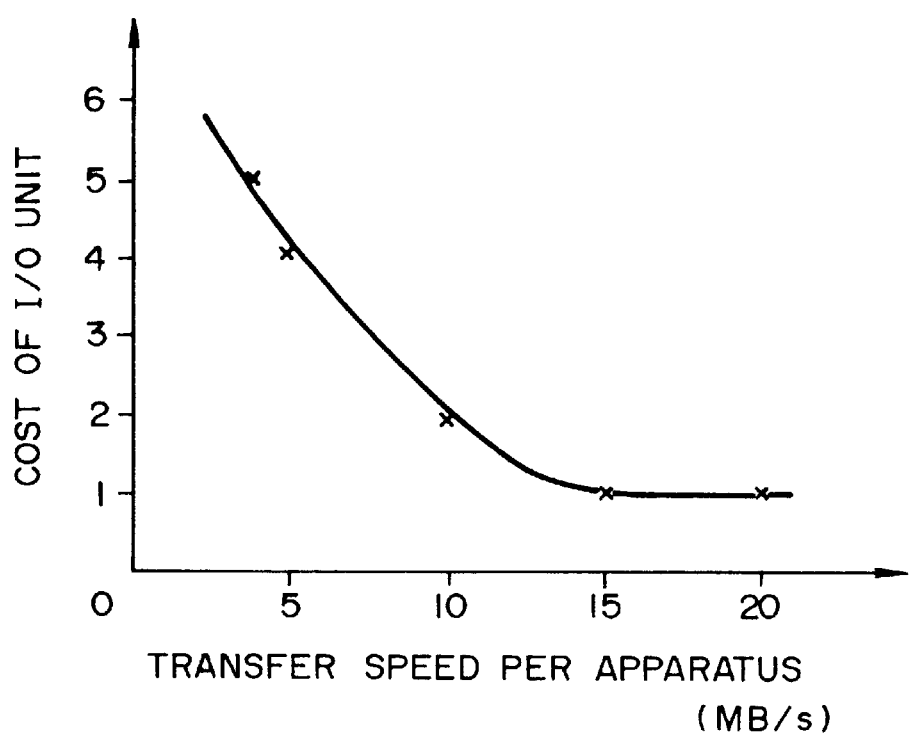
FIG. 7 is a graph showing the relation of input/output unit cost with respect to the transfer speed per magnetic disk apparatus.
Figure 8:
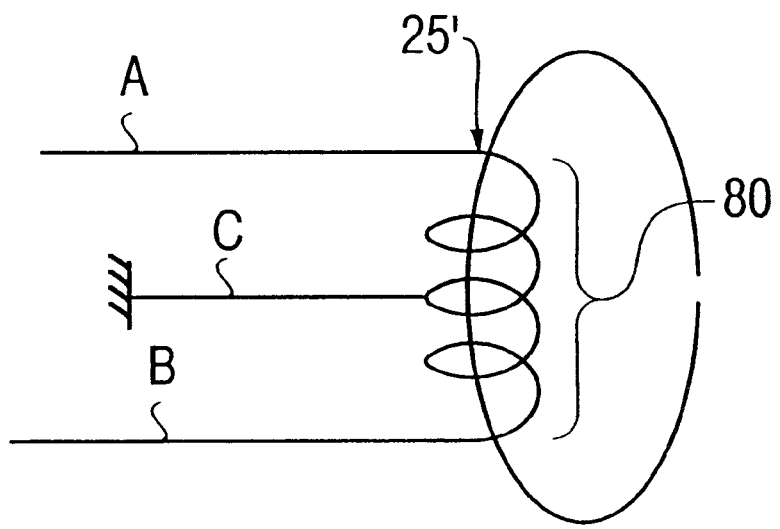
FIG. 8 is a view of a single layer, three terminal recording coil.
Figure 9:
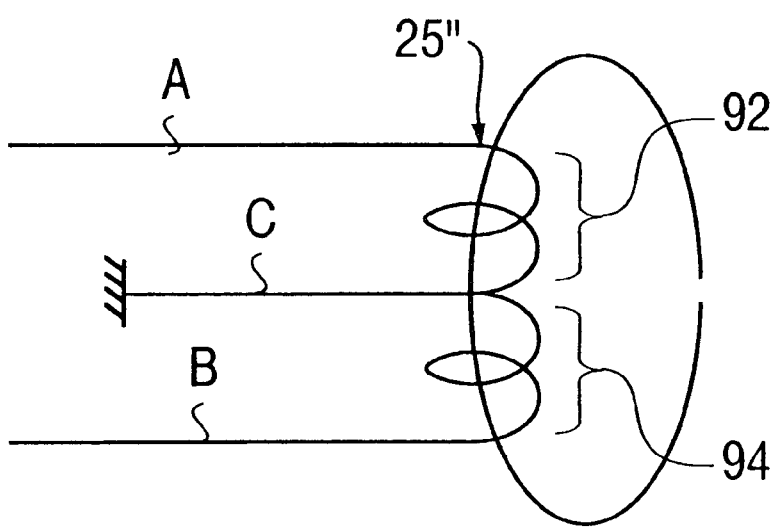
FIG. 9 is a view of a dual-layered, three terminal recording coil having a first coil and a second coil wound in opposite directions.

A description will be made of the results of examining the effect of the rise time of the recording current in the coil of the recording head on the recording characteristics. FIG. 5 is a graph showing measured overwrite values with respect to rise time in a range from 2 ns to 10 ns. In this case, after a high density, 144 kFCI, signal is overwritten on a low density, 23 kFCI, signal, the amount of the erased part of the low density signal is measured. The recording medium used for the measurement is a CoCrTa-based spattered medium which has a coercive force of 2000 Oe[Oersted]. From the results, it will be seen that if the rise time of the recording current is selected to be 5 ns or below, good overwrite characteristic can be obtained. In this experiment, three coil terminals were required in order for the rise time of the recording current to be 5 ns or below. FIG. 6 is a graph showing the relation of the rise time of recording current to the inductance of each coil. From FIG. 6, it will be obvious that the inductance of each coil is required to be 1 $\mu$H (microhenry) or below in order for the rise time of recording current to be 5 ns or below.

According to this invention, since it is possible to use the magnetic head in which the recording field intensity is not attenuated even if the recording frequency exceeds 45 MHz, the magnetic storage apparatus can rotate the disk at high speed, thereby achieving high speed transfer of data, reduction of access time and increase of storage capacity at a time.

What is claimed is:

1. A magnetic recording disk apparatus comprising:
a magnetic head including a magnetic pole made of a material with a resistivity $\rho(\mu\Omega\text{-cm})$ and with a relative permeability $\mu$, achieving a media data rate of 15 megabytes per second or greater and an areal data recording density of 500 Mb/in$^2$ or greater, wherein said $\rho$, said $\mu$ and d ($\mu$m) which means the thickness of said magnetic pole satisfies the relation $\mu d^2/\rho < 500$.

2. A magnetic recording disk apparatus according to claim 1, wherein said magnetic film includes an oxide.

3. A magnetic recording disk apparatus according to claim 2, further comprising, a magnetic disk of 3.5 inches or less in diameter, the magnetic disk rotating at a rate of 4000 rpm or greater, and a recording frequency of the magnetic disk being 45 MHz or greater.

4. A magnetic recording disk apparatus according to claim 8, wherein said magnetic disk includes a metal magnetic layer of 2000 Oe or greater in coercive force.

5. A magnetic recording disk apparatus according to claim 2, wherein said magnetic head includes a reproduction head having at least one of a magneto-resistive effect element, a spin-valve element and a giant magneto-resistive element.

6. A magnetic recording disk apparatus according to claim 1, wherein said magnetic film is formed of at least one of Zr, Y, Ti, Hf and Al, and an oxide of Si.

7. A magnetic recording disk apparatus according to claim 6, further comprising, a magnetic disk of 3.5 inches or less in diameter, the magnetic disk rotating at a rate of 4000 rpm or greater, and a recording frequency of the magnetic disk being 45 MHz or greater.

8. A magnetic recording disk apparatus according to claim 7, wherein said magnetic disk includes a metal magnetic layer of 2000 Oe or greater in coercive force.

9. A magnetic recording disk apparatus according to claim 6, wherein said magnetic head includes a reproduction head having at least one of a magneto-resistive effect element, a spin-valve element and a giant magneto-resistive element.

10. A magnetic recording disk apparatus according to claim 1, further comprising, a magnetic disk of 3.5 inches or less in diameter, the magnetic disk rotating at a rate of 4000 rpm or greater, and a recording frequency of the magnetic disk being 45 MHz or greater.

11. A magnetic recording disk apparatus according to claim 10, wherein said magnetic disk includes a metal magnetic layer of 2000 Oe or greater in coercive force.

12. A magnetic recording disk apparatus according to claim 1, wherein said magnetic head includes a reproduction head having at least one of a magneto-resistive effect element, a spin-valve element and a giant magneto-resistive element.

* * * * *